(12) United States Patent
Fitzsimons et al.

(10) Patent No.: US 7,842,325 B2
(45) Date of Patent: Nov. 30, 2010

(54) METHOD OF MAKING HIGH SOLIDS, HIGH PROTEIN DAIRY-BASED FOOD

(75) Inventors: Warren Fitzsimons, Fonterra Palmerston North (NZ); Sheelagh Hewitt, Fonterra Palmerston North (NZ); Stephen Gregory, Fonterra (NZ); Alistair Carr, Fonterra Palmerston North (NZ); Owen Mills, Fonterra Palmerston North (NZ)

(73) Assignee: Fonterra IP Limited, Auckland (NZ)

( * ) Notice: Subject to any disclaimer, the term of this patent is extended or adjusted under 35 U.S.C. 154(b) by 1340 days.

(21) Appl. No.: 10/499,173

(22) PCT Filed: Dec. 17, 2002

(86) PCT No.: PCT/NZ02/00279

§ 371 (c)(1),
(2), (4) Date: Mar. 25, 2005

(87) PCT Pub. No.: WO03/051130

PCT Pub. Date: Jun. 26, 2003

(65) Prior Publication Data

US 2005/0214431 A1   Sep. 29, 2005

(30) Foreign Application Priority Data

Dec. 17, 2001   (NZ) .................................... 516210

(51) Int. Cl.
*A23C 21/00*   (2006.01)
*A23C 19/00*   (2006.01)

(52) U.S. Cl. .................. 426/583; 426/41; 426/582; 426/657

(58) Field of Classification Search .................. 426/34, 426/36, 39, 41, 580, 582, 583, 585, 656, 426/657
See application file for complete search history.

(56) References Cited

U.S. PATENT DOCUMENTS

| | | | |
|---|---|---|---|
| 4,444,800 A | | 4/1984 | Bixby et al. |
| 4,865,865 A | | 9/1989 | Sano et al. |
| 5,165,945 A | | 11/1992 | Yee et al. |
| 5,171,603 A | | 12/1992 | Singer et al. |
| 5,629,037 A | | 5/1997 | Gaffney |
| 6,183,804 B1 | * | 2/2001 | Moran et al. ............... 426/582 |
| 6,242,016 B1 | | 6/2001 | Mehnert et al. |
| 6,667,068 B2 | | 12/2003 | Smith |
| 6,773,740 B2 | | 8/2004 | Hyde et al. |
| 6,861,080 B2 | | 3/2005 | Kent et al. |
| 6,972,321 B1 | | 12/2005 | Hotten |
| 7,192,619 B2 | * | 3/2007 | Dybing et al. ............... 426/580 |
| 2004/0208974 A1 | | 10/2004 | Calvert, Jr. |
| 2004/0224069 A1 | * | 11/2004 | Aird et al. .................... 426/582 |

FOREIGN PATENT DOCUMENTS

| | | |
|---|---|---|
| CA | 952 761 | 8/1974 |
| CA | 952761 | 8/1974 |
| CA | 2 370 410 | 8/2002 |
| EP | 0997073 A2 | 3/2000 |
| EP | 0 097 073 A2 | 5/2000 |
| JP | 58-158132 | 9/1983 |
| JP | 63-017656 | 1/1988 |
| JP | 06-113748 | 4/1994 |
| JP | 09-172964 | 7/1997 |
| WO | WO 91/03165 | 3/1991 |
| WO | WO 92/14367 A1 | 9/1992 |
| WO | WO 94/01000 A1 | 1/1994 |
| WO | WO 97/21353 | 6/1997 |
| WO | WO 97/35485 A1 | 10/1997 |
| WO | WO 99/07232 | 2/1999 |
| WO | WO 00/08951 | 2/2000 |
| WO | WO 00/27214 | 5/2000 |
| WO | WO 01/30181 A1 | 3/2001 |
| WO | WO 02/13620 A1 | 2/2002 |
| WO | WO 02/30210 | 4/2002 |
| WO | WO 02/080691 A1 | 10/2002 |
| WO | WO 02/080696 A1 | 10/2002 |
| WO | WO02/082917 | 10/2002 |
| WO | WO 2002/080691 | 10/2002 |
| WO | WO 2002/082917 | 10/2002 |
| WO | WO 02/096209 A1 | 12/2002 |
| WO | WO 02/096210 A1 | 12/2002 |
| WO | WO 03/003846 A1 | 1/2003 |

OTHER PUBLICATIONS

Fitzpatrick at al., "Practical considerations for reconstituting dairy powders to high solids content in a stirred-tank," Milchwissenschaft 56 (9) 2001 pp. 512-516.

* cited by examiner

*Primary Examiner*—Leslie Wong
(74) *Attorney, Agent, or Firm*—Knobbe Martens Olson & Bear LLP

(57) ABSTRACT

The present invention provides a process for producing a high solids/high protein dairy product wherein an MPC is first mixed with molten fat to produce a mixture of protein particles coated in fat and the mixture hydrated, acidified and heated under low shear to produce a dairy product, preferably a cheese or cheese-like product having a protein to water ratio of between 0.6 and 3.0.

21 Claims, 1 Drawing Sheet

METHOD OF MAKING HIGH SOLIDS, HIGH PROTEIN DAIRY-BASED FOOD

The present application is the U.S. National Phase of PCT/NZ02/000279, filed Dec. 17, 2002, and claims priority under 35 U.S.C. §119 to New Zealand Patent Application No. 516210, filed Dec. 17, 2001.

FIELD OF THE INVENTION

The present invention relates to the manufacture of high-solids, high-protein, dairy-based food products and in particular to the manufacture of cheese or cheese-like products.

The invention has been developed primarily for use in the development of hard cheeses or hard cheese-like products and will be described hereinafter with reference primarily to this application. However, it will be appreciated that the invention is not limited to this particular field of use.

BACKGROUND OF THE INVENTION

In most traditional cheese making processes, the whey proteins of milk, although highly nutritious, are removed from cheese curd in a whey drainage step. More recent advances have led to the development of processes for making cheese or cheese-like products that have eliminated the whey drainage step thereby improving both cheese yield and nutrition.

Patent Application WO 00/27214 (Blazey et al) is an example of a process for producing cheese that has eliminated the whey drainage step. This document discloses a method of making cheese in which pH adjusted, concentrated or reconstituted milk is ultra and diafiltered to produce a retentate. The retentate is then supplement with a protein concentrate or isolate; and the resulting mixture is heated to produce a smooth consistency. No enzymes, enzyme cultures, or microorganisms need be employed by the process.

Other recent developments involve the manufacture of cheese from a milk protein concentrate powder. Such methods have the advantage that cheese manufacture can be uncoupled from supply. That is, because the milk concentrate powder, when compared to fresh milk, can be stored for a significantly longer period without significant degradation (in terms of the ability to be converted to cheese-type products) cheese can be produced on demand, rather than being linked directly to milk supply. Manufacture of cheese from milk protein concentrate powder can also provide cost benefits in transport. Such benefits result from having a product that is of lower weight and volume than milk and that can be used to manufacture cheese.

U.S. Pat. No. 6,183,804 (Moran et al) discloses a two stage process for producing a process cheese-type product. The first stage of the process involves producing a powder milk protein concentrate by ultrafiltration to produce a retentate and then spray drying the retentate. The second stage of the process involves hydrating the powdered milk protein concentrate by mixing the powered milk protein concentrate with water and adjusting the pH of the hydrated milk protein concentrate to between 4.8 and 5.5. Optionally fat is added to the mixture. The mixture is then heated and subjected to shear to form fresh cheese. Flavour additives and emulsifiers are blended with the fresh cheese during a further heating step for a time sufficient to obtain a homogeneous process cheese-type product. Once again no enzymes, enzyme cultures, or microorganisms are employed and there is no formation or separation of curds and whey. U.S. Pat. No. 6,183,804 also discloses that cream may be used to hydrate the powdered milk protein concentrate.

U.S. Pat. No. 6,242,016 (Mehnert et al) discloses the manufacture of grated Parmesan cheese using an ultrafiltered retentate. The retentate is then fermented followed by the addition of a milk clotting enzyme. The fermented retentate is then subjected to an evaporation step to form a Parmesan cheese with a moisture content of 18 to 24%.

U.S. Pat. No. 4,444,800 (Bixby et al) discloses the manufacture of imitation cheese products of up to 70% total solids (30% moisture). It uses rennet casein and emulsifying salts.

U.S. Pat. No. 5,165,945 (Yee et al) also discloses the manufacture of high solids content cheese. The cheese is made by subjecting milk to ultra and diafiltration, adding a milk clotting enzyme and heating for a sufficient time to coagulate the retentate and followed by the removal of water. Again this is a direct from milk process. The inventors in U.S. Pat. No. 5,165,945 note that excessive solids result in an oily and broken down texture. The document discloses the process of the invention is capable of producing cheese having solids content from 40 to above about 70% by weight. The clotting enzyme is essential to provide such high solids content according to this process. It is generally considered in the art (for example Fitzpatrick J J et al, Practical considerations for reconstituting dairy powders to high solids content in a stirred-tank, Milchwissenschaft 56(9) 2000, pages 512-516) that a high-solids, high-protein recombining process would result in the development of extremely high viscosities during hydration. It is also generally considered that rapid formation of the protein matrix would provide inadequate time for fat dispersion and, simultaneously, fat destabilization would occur as the protein matrix tightened.

It is an object of the present invention to provide a flexible and rapid process for the manufacture of a high-solids (low moisture), high-protein, dairy-based food product such as a hard cheese block, cheese "crumble", grated/milled hard cheese or dairy-based condiment, which overcomes, at least to some extent, the problems aforesaid, or at least to provide the public with a useful choice.

SUMMARY OF THE INVENTION

In a first aspect the present invention provides a process for producing a dairy product comprising the steps:
(a) mixing together MPC and/or whey protein adjusted MPC with fat to form a paste of protein particles coated in fat, the MPC and/or whey protein adjusted MPC containing at least 60% protein on a solids-non-fat (SNF) basis;
(b) hydrating and acidifying the paste to form a mixture with a pH of between about 4.5 and 6.0; and
(c) heating and mixing said mixture until a homogeneous mass forms, to produce a final dairy product having a protein:water ratio of between 0.6 and 3.0.

The protein:water ratio of final dairy product is preferably between 0.75 and 3.0, more preferably between 1.0 and 3.0 and most preferably between 1.5 and 3.0.

Salt (NaCl) may be mixed in with the ingredients at any one or more of steps (a), (b) and (c).

The MPC and/or whey protein adjusted MPC and fat, and optionally salt, may be mixed in step (a) at a temperature of between 0 and 60° C., preferably at a temperature between 35 and 55° C.

The MPC and/or whey protein adjusted MPC is preferably dried and most preferably in the form of a powder. The dried MPC and/or whey protein adjusted MPC may have a protein content of at least 60-70% on a SNF basis, and preferably has a protein content of at least 85% on a SNF basis.

The fat may be sourced from any product which includes a high level of fat (i.e >60%) such as high fat cream, milk fat, anhydrous milk fat, butter, oils such as vegetable oils, or any other edible fat, and may comprise a combination of such fats.

In step (b) the paste may be hydrated by the addition of water and acidified by the addition of a food grade acid such as citric acid, lactic acid, hydrochloric acid, sulphuric acid etc.

In step (c) the acidified mixture may be heated to a temperature of between 75 and 95° C., and more preferably between 80 and 90° C. and mixed at low shear (eg between 50-250 rpm).

Once the homogeneous mass has been formed, the mixture may be cooled directly or may be placed in a mould before being allowed to cool.

Preferably the dairy product is a cheese or cheese-like product selected from the group comprising cheddar, cheddar-like cheese, parmesan, parmesan-like cheese, gouda, gouda-like cheese, edam, edam-like cheese and any other hard cheese in a solid block or crumble form.

Depending on the desired composition of the dairy product, the process may preferably include the step of adding cream powder and/or further MPC (including whey protein adjusted MPC and fat adjusted MPC) during or after step c).

In a second aspect the present invention provides a dairy-based food product produced by a method of the invention. Preferably said dairy product is a cheese selected from cheddar, cheddar-like cheese, gouda, gouda-like cheese, edam, edam-like cheese, parmesan, parmesan-like cheese and any other hard cheese in block or crumble form.

DESCRIPTION OF THE FIGURES

A preferred embodiment of the invention will now be described, by way of example only, with reference to the accompanying drawing in which.

DETAILED DESCRIPTION

Figure 1:
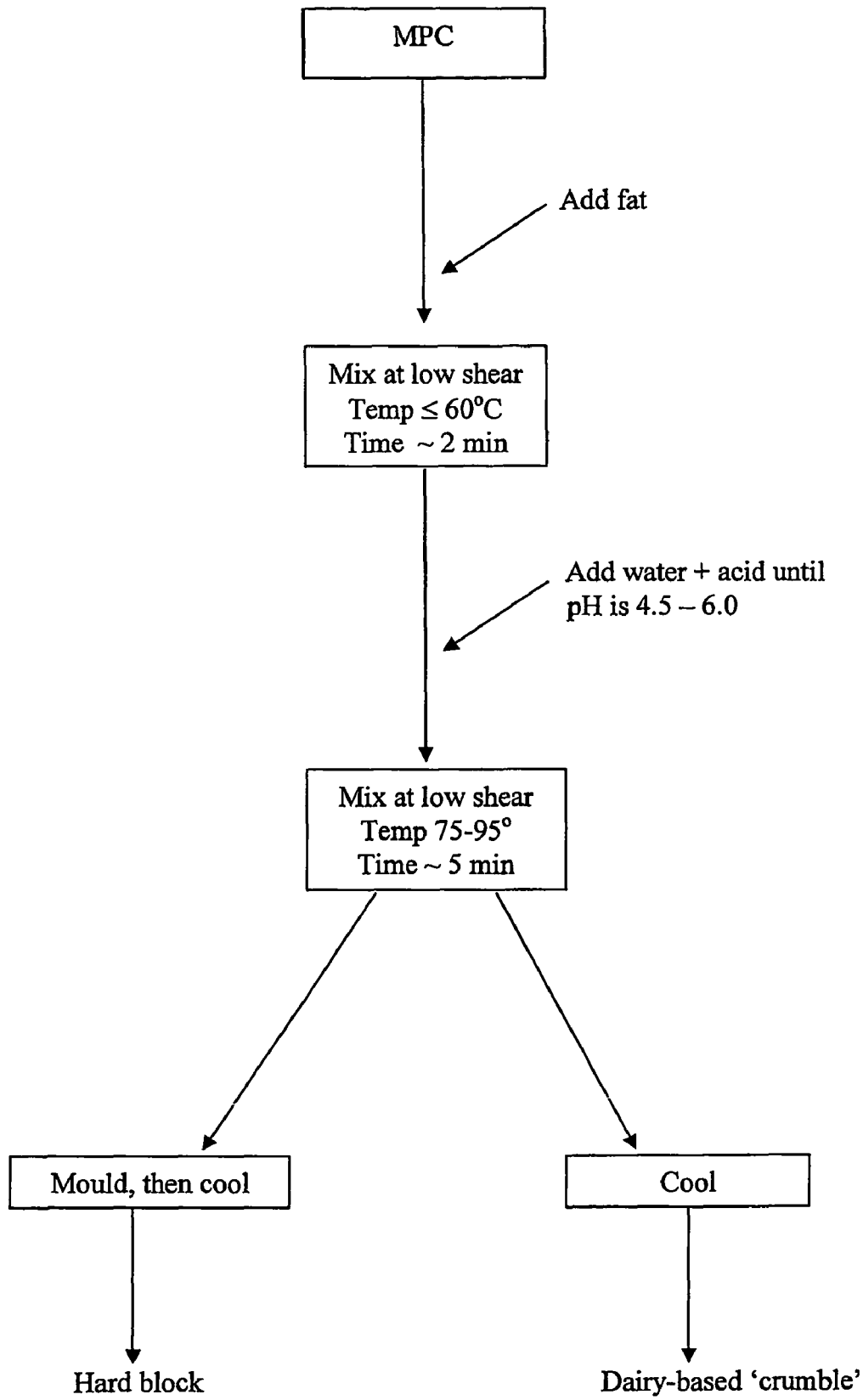
FIG. 1 is a schematic diagram generally illustrating the process of the invention.

The present invention provides an alternative process of making a cheese having a higher total solids composition than can be achieved from known recombined cheese processing methods. In particular, the process of the present invention allows the ingredients to be combined more easily and have a greater processability than the same ingredients when used in prior art processes. Further, the process of the invention is flexible in that the process can be modified in a number of ways to modify the characteristics of the final cheese product. The cheeses made by the process of the present invention can also form stable functional ingredients for further processing.

In a first embodiment, the present invention provides a process for producing a dairy product comprising the steps
(a) mixing together MPC and/or whey protein adjusted MPC with fat to form a paste of protein particles coated in fat, the MPC and/or whey protein adjusted MPC containing at least 60% protein on a solids-non-fat (SNF) basis;
(b) hydrating and acidifying the paste to form a mixture with a pH of between about 4.5 and 6.0; and
(c) heating and mixing said mixture until a homogeneous mass forms, to produce a dairy product having a protein: water ratio of between 0.6 and 3.0.

The general steps of this process are set out in FIG. 1.

The dairy product made by this process may comprise a hard or extra hard cheese including cheddar, cheddar-like cheese, gouda, gouda-like cheese, edam, edam-like cheese, parmesan, parmesan-like cheese and any other hard cheese in block or crumble form.

The starting milk protein concentrate (MPC) may be produced from milk sourced from any milk producing animal by methods known in the art or purchased from a commercial source such as from New Zealand Milk Products Ltd.

By MPC is meant a milk protein product in which the milk protein content of the dry matter is above that typically found in milk and the ratio of casein to whey proteins is approximately that of milk. Preferably the milk protein content of the MPC is at least 60%, and more preferably 70% or more, of the solids-non-fat (SNF) dry matter. Such concentrates are known in the art. Dried MPC can be formed by evaporating or drying MPC by techniques known in the art.

"Whey protein adjusted MPC" as used herein means an MPC which has been adjusted in whey protein content either by increasing the whey protein content by adding whey protein from a dairy stream such as whey protein concentrate or permeate from microfiltered skid milk, for example, or by depleting the whey protein content by microfiltration, for example.

"Fat adjusted MPC" as used herein means an MPC which has been adjusted in fat content either by increasing the fat content by adding fat such as cream, for example, or by depleting fat by known methods.

The fat may be sourced from any product which includes a high level of fat (i.e >60%) such as high fat cream, milk fat, anhydrous milk fat, butter, oils such as vegetable oils, or any other edible fat, and may comprise a combination of such fats.

The preferred embodiment of the invention involves a three step process as set out above. Step (a) involves mixing MPC powder and fat at a temperature sufficient to melt the fat and form a paste of powder particles coated with liquefied fat. The MPC powder contains preferably 70% or more protein on an SNF basis and is selected from the group comprising standard, ion-exchanged MPC, mineral-adjusted MPC, whey protein or fat adjusted MPC or a combination of one or more such MPCs. The fat source, which is preferably anhydrous milk fat, can optionally be flavoured and/or coloured. Salt (NaCl), emulsifying salts (e.g. disodium phosphate), flavours and colours are optionally added to the mixture in this first step. The paste of powder particles coated with liquefied fat is formed by mixing the mixture at low shear (eg 50-250 rpm in a blentech cooker) at up to 60° C. (preferably 40-50° C. when milk fat is used) for at least one minute, preferably two minutes. As mentioned above, the temperature of mixing needs to be sufficiently high to ensure that the fat is molten, so that it can coat the protein with a sufficient covering of fat to control subsequent hydration of the MPC powder—fat mixture whilst maintaining the processability of the mixture by avoiding degrees of viscosity which would be too high to work with. As different fat sources have different melting points, the temperatures at which the ingredients of step (a) are mixed will vary depending on the fat source as will be appreciated by a skilled person. For oils, the mixing of MPC and fat may occur at room temperature or below. For milk fat, a temperature of about 40° C. is preferred.

Preferably the amount of fat added during the step (b) is calculated to constitute less than 35%, more preferably less than 25% of the final dairy product. With higher fat levels problems such as poor fat incorporation and fat destabilisation can occur which may lead to the formation of a greasy product.

If the temperature during the formation of the paste is too high, destabilization of the protein/fat matrix during the subsequent heating/low shear mixing stage may result. Because of this it has been found desirable to keep the temperature of the initial mixing of the dried MPC and milk fat at step (a) to 60° C. or below.

Without being bound by theory, the inventors believe that the process of the present invention achieves a high protein: water ratio in the final dairy product by controlling the rate and extent of hydration of the protein so that enough water is added to develop the desired texture and structure for the final dairy product, without destabilising the fat. Such controlled hydration appears to avoid the exponential increase in viscosity observed when reconstituting milk protein powders to high solids concentration in prior art processes.

Step (b) involves hydrating and acidifying the paste of powder particles coated with liquefied fat. This involves the addition of acid and water to adjust the pH to 4.5 to 6.0. For a hard or extra hard cheese block, the pH should be adjusted to give a final pH of 5.2-5.6. For a "crumble" product i.e. a solid cheese mass which easily disintegrates upon application of force, the pH should be adjusted to approximately 4.6-4.8, with the later addition of further MPC powder, preferably after step (c), to bring the pH back up into the range 5.2-5.6. Those skilled in the art will appreciate that it is the final pH of the product that is important for product characteristics, such as flavour or microbiological stability.

The hydration needs to be sufficient to provide enough moisture for a cheese or cheese-like product to form. However it should not be so much as to lead to the formation of viscosities that are too high to be practical to work with. The degree of hydration should therefore be controlled such that a stable dairy product can result, i.e. a product where the fat is dispersed and entrapped within the protein matrix, while maintaining the processability of the mixture.

For pH adjustment, any food grade, organic or inorganic acid can be used such as lactic acid, citric acid, hydrochloric acid, sulphuric acid etc. Salt, flavour or colours are optionally added at this step.

In step (c) the mixture is heated to a temperature of between 75-85° C., preferably by direct steam injection and mixing conducted at low shear for between one and ten minutes, preferably between two and five minutes until a homogeneous mass forms with no free fat and no lumps of undissolved powder. The protein:water ratio of the dairy product is typically between 0.6 and 3.0, preferably between 0.75 and 3.0, more preferably between 1.0 and 3.0 and most preferably between 1.5 and 3.0.

It is also been found that during step (c) it is desirable to have a temperature of between 75° C. and 95° C. to ensure all of the fat is incorporated into the protein matrix and to avoid fat destabilisation.

Further, it is desirable that the heating/low shear mixing at step (c) is conducted for between one and ten minutes, as when the mixture is mixed for more than ten minutes the mix can develop extremely high viscosity, which is unmanageable and there is also the potential for fat destabilization.

Further MPC powder, fillers (such as vegetable protein, starch, maltodextrin, or rice flour), flavours and seasonings, additional salt and acid is optionally added after step (c) to further modify flavour and texture or further increase the solids content of the dairy product. Fat adjusted MPC or cream powder can also be added if desired. If such additional ingredients are used, further mixing is conducted at approximately 75 to 85° C. (without the need for any additional heating) for one minute or more, preferably two minutes to blend added ingredients. To achieve a dairy product having a high protein:water ratio such additional ingredients may be required.

Other GRAS (Generally Regarded As Safe) ingredients common to cheese making processes, may be added at any step in the process to alter any functional characteristic or to improve flavour, texture, colour and the like, as would be understood by a person of skill in the art.

GRAS ingredients include non-dairy ingredients such as stabilisers, emulsifiers, natural or artificial flavours, colours, starches, water, gums, lipases, proteases, mineral and organic acid, structural protein (soy protein or wheat protein), and anti microbial agents as well as dairy ingredients which may enhance flavour and change the protein to fat ratio of the final cheese. In particular, flavour ingredients may comprise various fermentation and/or enzyme derived products or aged cheese or mixtures thereof as would be appreciated by a skilled worker. The flexibility of allowing any combination of additives to be added at any step in the process allow the final composition of the cheese to be precisely controlled, including the functionality characteristics.

All of the mixing described in the present invention is preferably conducted at low shear, e.g. 50-250 rpm in a blentech cooker. However, mixing could also be conducted at high shear, eg 1500-3000 rpm in a stephan cooker.

Once the homogeneous mass has been formed, it is allowed to cool to form the dairy product, the mass may be shaped or pressed in a mould before cooling.

Where the dairy product is a hard cheese or extra hard cheese in block form, such a hard block may be further processed, e.g., shredded, or grated, milled and dried. Free flow agents (e.g., silica), anti-mycotic agents (e.g. potassium sorbate) and flavours (e.g. seasonings) can be added to the shredded or grated/milled cheese product to improve flow characteristics and shelf stability. If the homogeneous mass is simply allowed to cool without moulding or further processing a dairy-based "crumble" will form. In a preferred embodiment the crumble has a moisture range of 15-25%. The crumble can be further processed or grated/milled.

The process of the preferred embodiment uses conventional food processing equipment, such as processed cheese equipment, and the unit operations are standard as would be understood by a person skilled in the art.

It is anticipated that ion-exchange, mineral-adjusted, whey protein or fat adjusted MPCs can be used to optimize the dairy products produced by the process of the invention and to manipulate the specific textural characteristics of the dairy products. Emulsifying salts and other GRAS ingredients can also be used to manipulate the textural characteristics of the dairy product as would be understood by a skilled person.

In particular, emulsifying salts such as disodium phosphate, polyphosphate, or citrate are all suitable for use in the invention. Typically, salt and emulsifying salts are added as part of the initial powder mix in step (a).

Dried MPC is commercially available in a number of forms. MPC56, MPC70 and MPC85 are three such common forms available from new Zealand Milk Products Ltd., the "56", "70" and "85" referring to the present protein found in these powders. It is anticipated that any combination of MPC types to give a percent protein of at least 60% and preferably 70% or more will work in the invention, for example a 50:50 mixture of MPC70 and MPC85. Similarly any combination of fat, fillers, flavour ingredients, seasonings, acids, salts and emulsifying salts and other GRAS ingredients can be used depending on the desired characteristics of the dairy product.

The present invention also provides a alternative manufacturing process for the production of grated/dried Parmesan style cheese. This advantage is derived from the elimination (or at least uncoupling) of the drying step that is required with the traditional manufacture of Parmesan cheese.

A significant advantage of the process of the present invention over traditional cheese making processes is that the product is formed without the need for maturation, although the product can be aged if desired.

The present invention can be used to produce dairy products other than cheese or cheese-like products. For example, by adding various flavours or emulsifiers to the process of the invention, dairy products can be formed that have quite different taste and texture to traditional cheeses. For example the present invention could be used to make a peppermint, tomato, strawberry, etc flavoured gel/crumble product.

In a further embodiment, the present invention provides a hard or extra hard cheese product produced by the process of the invention.

The present invention also provides a food product comprising the cheese of the present invention.

Any ranges mentioned in this patent specification are intended to inherently include all of the possible values within the stated ranges.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The present invention will now be exemplified.

EXAMPLE 1

1319 g of anhydrous milk fat was placed into a twin screw process cheese cooker with a capacity of 5 kg (Blentech Corporation, Rohnert Park, Calif.) that had been pre-heated to 100° C. This was blended for 1 minute with the rotational speed of the twin screws set at ~170 rpm. 1436 g of MPC 70 (marketed as ALAPRO® 4700 by NZMP Ltd), and 72 g of NaCl were added to the cooker and blended for 1.5 minutes. At this point the blend had reached 50° C. 1293 g of cold water and 50 g of 80% lactic acid were added and mixed with culinary steam until the temperature reached 85° C. After the steam was turned off, the product was mixed for 2 minutes. The hot product was thick and creamy and well blended, with no free fat. It pumped easily out of the cooker into moulds and was chilled to set. The final product had a firm, cheese-like texture, similar to Cheddar cheese. The protein to water ratio was 0.6, moisture content 38%, pH 5.46 and fat content about 30%.

EXAMPLE 2

1328 g of anhydrous milk fat was placed into a twin screw process cheese cooker with a capacity of 5 kg (Blentech Corporation, Rohnert Park, Calif.) that had been pre-heated to 100° C. This was blended for 1 minute at ~170 rpm. 1296 g of MPC 85 (marketed as ALAPRO® 4850 by NZMP Ltd), 247 g of sweet whey powder (marketed as ALAWAY® 621 by NZMP Ltd), 75 g of disodium phosphate and 72 g of NaCl were added to the cooker and blended for 6 minutes. At this point the mixture had reached 50° C. 1070 g of cold water mixed with 81 g of 80% lactic acid were added and mixed with culinary steam until the temperature reached 85° C. After the steam was turned off, the product was mixed for 2 minutes. The hot product was thick, smooth and well blended, with no free fat. It pumped easily out of the cooker into moulds, and was chilled to set. The final product had a firm, cheese-like texture, similar to Parmesan cheese. The protein to water ratio was 0.7, moisture content 35.4%, pH 5.38 and fat content about 30%.

EXAMPLE 3

Into a twin screw process cheese cooker with a capacity of 5 kg (Blentech Corporation, Rohnert Park) that had been preheated to 100° C. was placed 1328 g of anhydrous milk fat, 1,636 g of MPC 70 (marketed as ALAPRO® 4700 by NZMP Ltd), and 72 g NaCl. The ingredients were then mixed for 3 minutes at ~170 rpm. At this point the blend temperature was 50° C. 1067 g of cold water and 68 g of 88% lactic acid were added and mixed with culinary steam until the temperature reached 85° C. The mixture was then cooked for 2 minutes. An homogeneous mass formed and was easily pumped out of the cooker and cooled in moulds. The final block was firm and had a cheese-like texture, similar to Cheddar cheese. The pH of the final product was 5.5, moisture content 33.7%, protein 25% and fat 20%. The protein to water ratio was 0.8

EXAMPLE 4

873 g of anhydrous milk fat was placed into a twin screw process cheese cooker with a capacity of 5 kg (Blentech Corporation, Rohnert Park, Calif.) that had been pre-heated to 100° C. This was blended for 1 minute at ~170 rpm. 2093 g of MPC 70 (marketed as ALAPRO® 4700 by NZMP Ltd) and 72 g of NaCl were added to the cooker and blended for 1.5 minutes. At this point the blend temperature was 50° C. 1047 g of cold water and 86 g of 88% lactic acid were added and mixed with culinary steam until the temperature reached 85° C. After the steam was turned off, the product was mixed for 2 minutes. The hot mass was uniformly blended, slightly spongy, with no free fat. It was pumped out of the cooker into block moulds, then chilled. The final product had a firm, cheese-like texture, similar to Cheddar cheese. The protein to water ratio was 1.0, moisture content 32.2%, pH 5.42 and fat content of 20%.

EXAMPLE 5

1,187 g of anhydrous milk fat, 2,040 g MPC 85 (marketed as ALAPRO 4850 by NZMP Ltd), 95 g NaCl and 104 g disodium phosphate were mixed at low shear in a twin screw process cheese cooker with a capacity of 5 kg (Blentech Corporation, Rohnert Park, Calif.) and heated to 35° C. by indirect steam. The mixture was blended for 2 minutes at ~170 rpm. 1,052 g of water and 52 g of citric acid were added and mixed at low shear with direct steam addition until the temperature of the mixture reached 85° C. This took 5 minutes and 38 seconds. The steam was turned off and low shear mixing continued. The temperature peaked at 88.6° C. 50 g of dried Romano flavour was added over a period of 20-30 seconds, while low shear mixing continued. After 12 minutes of mixing a smooth emulsion homogeneous mass formed. The emulsion was cooled at ambient temperature. The product has a firm, cheese-like texture., similar to Parmesan cheese. The final pH of the product was 5.4. The protein to water ratio was 1.2 and the fat content was 25%.

EXAMPLE 6

1,958 g of MPC 56 (marketed as ALAPRO® 4560 by NZMP Ltd), 869 g anhydrous milk fat, and 72 g of NaCl were placed into a twin screw process cheese cooker with a capacity of 5 kg (Blentech Corporation, Rohnert Park, Calif.) that had been pre-heated to 100° C. These ingredients were then mixed for 3 minutes at ~170 rpm. At this point the blend had reached 57° C. 621 g of cold water and 120 g of 88% lactic acid were added and mixed with culinary steam until the temperature reached 85° C. The mixture was then cooked for 2 minutes. Another 658 g of MPC 56 was added and mixed for 2 minutes. A homogeneous mass formed, discharged onto a tray, and cooled quickly in a freezer (−18° C.). When cooled, the product was milled using an Urschel Commitrol mill with 120th of an inch cutting head. After milling, fine granules, similar to dried, grated cheese, were formed. The pH of the end product was 5.2, the protein to water ratio was 1.6, fat content was 30% and the moisture content 20.7%.

EXAMPLE 7

Into a twin screw process cheese cooker with a capacity of 5 kg (Blentech Corporation, Rohnert Park, Calif.), pre-heated to 100° C. was placed 873 g of anhydrous milk fat, 1607 g of MPC 70 (marketed as ALAPRO® 4700 by NZMP Ltd) and 72g of NaCl. The ingredients were blended for 3 minutes at ~170 rpm. At this point the blend temperature was 47° C. 626 g of cold water and 120 g of 88% lactic acid were added and mixed with culinary steam until the temperature reached 85° C. After the steam was turned off; the product was mixed for 2 minutes. 386 g more MPC 70 and 635 g of cream powder (marketed as ALACO Cream Powder 70 by NZMP Ltd) was added to the blend and mixed for 2 minutes. The hot product was easily pumped out of the cooker onto a tray, spread out evenly and then chilled rapidly in a freezer (−18° C.). When cooled, the product was milled using an Urschel Commitrol mill with 120th of an inch cutting head. After milling, fine granules, similar to dried, grated cheese, were formed. The protein to water ratio was 1.6, with 21.3% moisture, 30.2% fat, 32% protein and a pH of 5.1.

EXAMPLE 8

869 g of anhydrous milk fat was placed into a twin screw process cheese cooker with a capacity of 5 kg (Blentech Corporation, Rohnert Park, Calif.) that had been pre-heated to 100° C. This was blended for 1 minute at ~170 rpm. 1476 g of MPC 70 (marketed as ALAPRO® 4700 by NZMP Ltd), and 72 g of NaCl were added to the cooker and blended for 2 minutes. At this point the blend temperature was 53° C. 554 g of cold water and 120 g of 88% lactic acid were added and mixed with culinary steam until the temperature reached 85° C. After the steam was turned off, the product was mixed for 2 minutes. 604 g of MPC 70 and 604 g of Maize Cornflour were added to the cooker and mixed for 2 minutes. A homogeneous mass formed and was cooled quickly on a tray in a freezer (−18° C.). When cooled, the product was milled using an Urschel Commitrol mill with 120th of an inch cutting head. After milling, fine granules, similar to dried, grated cheese, were formed. The protein to water ratio was 1.6, with 20.2% moisture, 19.9% fat, 32.9% protein and a pH of 5.22.

EXAMPLE 9

1,605 g of MPC 70 (marketed as ALAPRO® 4705 by NZMP Ltd), 933 g anhydrous milk fat and 74 g of NaCl were placed in a a twin screw process cheese cooker with a capacity of 5 kg (Blentech Corporation, Rohnert Park, Calif.) that had been pre-heated to 100° C., and mixed for 2 minutes at ~170 rpm. 505 g of water and 120 g of 88% lactic acid were added and mixed with direct steam until the temperature reached 85° C. The mixture was then mixed for 4 minutes. 1,016 g more MPC 70 were added and again mixed at low shear for 1 minute. A homogeneous mass formed which was emptied onto a tray and cooled rapidly. A crumble with no visible fat resulted that could easily be ground to become similar to grated, dried cheese. The pH of the final product was 5.6, fat content was 20%, and moisture content 21.5%. The protein to water ratio was about 1.9.

EXAMPLE 10

A twin screw process cheese cooker with a capacity of 5 kg (Blentech Corporation, Rohnert Park, Calif.) was preheated to 100° C. with steam. 1553 g of MPC 70 (marketed as ALAPRO® 4700 by NZMP Ltd), 72 g of NaCl and 1130 g of high solids cream (78% solids) were put into the cooker, then mixed for 1 minute at ~170 rpm. At this point the blend had reached 53° C. 360 g of water with 120 g of 88% lactic acid mixed into it was added to the cooker and mixed with addition of culinary steam to heat the contents to 85° C. The heated mass was mixed for 2 minutes. 1063 g more MPC 70 was added and mixed for 2 minutes. The final product formed fine granules, similar to grated, dried cheese. It had a final moisture content of 20.0%, 19.7% fat, 41.0% protein, 6.1% ash and pH of 5.3. The protein to water ratio was 2.1.

EXAMPLE 11

A twin screw process cheese cooker with a capacity of 5 kg (Blentech Corporation, Rohnert Park, Calif.) was preheated to 100° C. with steam. 1605 g of MPC 70 (marketed as ALAPRO® 4705 by NZMP Ltd), 74 g of NaCl and 933 g of anhydrous milk fat were put into the cooker, then mixed for 2 minutes at ~~170 rpm. At this point the blend had reached 53° C. 305 g of water with 60 g of citric acid powder dissolved into it was added to the cooker and mixed with addition of culinary steam to heat the contents to 88° C. The heated mass was mixed for 2 minutes. 1016 g more MPC 70 was added and mixed for 1 minute. The final product formed fine granules, similar to grated, dried cheese. It had a final moisture content of 14.7%, 24.5% fat and pH of 5.89. The protein to water ratio was about 2.9.

The following two examples are comparative examples carried out in accordance with prior art methods where all ingredients were simply mixed together without first forming a paste of protein powder and fat.

COMPARATIVE EXAMPLE 1

A twin screw process cheese cooker with a capacity of 5 kg (Blentech Corporation, Rohnert Park, Calif.) was preheated to 100° C. 2477 g of MPC 70 (marketed as ALAPRO® 4700 by NZMP Ltd), 1187 g anhydrous milk fat, 95 g salt, 52 g citric acid and 1052 g water were added to the cooker, then mixed. Steam was turned on and the mixture heated to 85° C. The product was then mixed for 15 minutes (at ~170 rpm) with regular checking to see if the fat had been incorporated. At no point in the 15-minute period was the fat incorporated, and hence no emulsion was formed. The protein formed nuggets about 1-2 cm in diameter, with a pool of fat around and coating them. The final dairy product did not resemble a cheese-like product.

COMPARATIVE EXAMPLE 2

A twin screw process cheese cooker with a capacity of 5 kg (Blentech Corporation, Rohnert Park, Calif.) was preheated to 100° C. 2477 g of MPC 70 (marketed as ALAPRO® 4700 by NZMP Ltd), 1187 g anhydrous milk fat, 95 g salt, 104 g disodium phosphate 52 g citric acid and 1052 g water were added to the cooker, then mixed at ~170 rpm. Steam was turned on and the mixture heated to 85° C. with mixing. The product was then mixed for a further 15 minutes, with regular checking, to see if the fat had been incorporated. At no point in the 15-minute period was the fat incorporated. The product was a very viscous mass of hydrated protein stuck to the augers with lots of free fat on the surface and pooling around it. The final product did not resemble a cheese-like product.

INDUSTRIAL APPLICATION

The process of the present invention provides dairy products and more particularly cheese products having a high protein to water ratio in a relatively simple and fast process using conventional cheese making apparatus.

Although the invention has been described with reference to specific examples, it will be appreciated by those skilled in the art that it is not intended to limit the invention to the above examples only, many variations being possible without departing from the scope of the invention as defined in the accompanying claims.

What we claim is:

1. A process for producing a dairy product comprising the steps:
   (a) mixing together MPC and/or whey protein adjusted MPC with fat to form a paste of protein particles coated in fat, the MPC and/or whey protein adjusted MPC containing at least 60% protein on a solids-non-fat (SNF) basis;
   (b) hydrating and acidifying the paste to form a mixture with a pH of between about 4.5 and 6.0; and
   (c) heating and mixing said mixture until a homogeneous mass forms, to produce a dairy product having a protein:water ratio of between 0.6 and 3.0.

2. A process as claimed in claim 1, wherein the protein:water ratio of the dairy product is between 0.75 and 3.0.

3. A process as claimed in claim 2, wherein the protein:water ratio of the final dairy product is between 1.0 and 3.0.

4. A process as claimed in claim 3, wherein the protein:water ratio of the dairy product is between 1.5 and 3.0.

5. A process as claimed in claim 1, wherein salt (NaCl) is mixed in with the ingredients at any one or more of steps (a) and (c).

6. A process as claimed in claim 1, wherein the MPC and/or whey protein adjusted MPC and fat are mixed in step (a) at a temperature of between 0 and 60° C.

7. A process as claimed in claim 6, wherein MPC and fat are mixed in step (a) at a temperature of between 35 and 55° C.

8. A process as claimed in claim 1, wherein the MPC and/or whey protein adjusted MPC is dried and in the form of a powder.

9. A process as claimed in claim 8, wherein the dried MPC and/or whey protein adjusted MPC has a protein content of at least 70% on a SNF basis.

10. A process as claimed in claim 9, wherein the dried MPC has a protein content of at least 85% on a SNF basis.

11. A process as claimed in claim 1, wherein the fat comprises a fat selected from the group consisting of high fat cream, milk fat, anhydrous milk fat, butter, oil, vegetable oil, and any other edible fat.

12. A process as claimed in claim 1 or 11, wherein the amount of fat added in step (a) is calculated to constitute less than 35% of the dairy product.

13. A process as claimed in claim 1, wherein in step (b) the paste is hydrated by the addition of water and acidified by the addition of one or more suitable food grade acids.

14. A process as claimed in claim 1 or 13, wherein the mixture of step (b) is acidified to a pH of between 5.2 and 5.6.

15. A process as claimed in claim 1, wherein in step (c) the acidified mixture is heated to a temperature of between 75 and 95° C. and mixed at low shear.

16. A process as claimed in claim 15, wherein the mixture at step (c) is heated to 80-90° C.

17. A process as claimed in claim 1 wherein one or more GRAS ingredients are added at one or more of steps (a) to (c).

18. A process as claimed in claim 17, wherein said GRAS ingredients are selected from the group consisting of non-dairy stabilizers, emulsifiers, natural or artificial flavors, seasonings, salt, colors, starches, maltodextrin, rice flour, water, gums, lipases, proteases, mineral and organic acids, structural protein (soy protein or wheat protein), anti microbial agents non-dairy fat, dairy flavors including fermentation and enzyme derived products or aged cheese or mixtures thereof, dairy fat, cream powder, MPC and dairy protein containing ingredients.

19. A process as claimed in claim 1 further comprising step (d) wherein additional MPC, protein adjusted MPC, fat adjusted MPC, one or more fillers and/or cream powder is added to the mixture after step (c) and additional mixing carried out at 75-85° C. for at least one minute to increase the solids content of the dairy product.

20. A process as claimed in claim 1 wherein once the homogeneous mass has been formed, the mixture is cooled directly or placed in a mold before being allowed to cool to form a dairy product.

21. A process as claimed in claim 1 where the dairy product is a cheese or cheese-like product selected from the group consisting of cheddar, cheddar-like cheese, parmesan, parmesan-like cheese, edam, edam-like cheese and any other hard cheese in a solid block or crumble form.

* * * * *

UNITED STATES PATENT AND TRADEMARK OFFICE
CERTIFICATE OF CORRECTION

| | | |
|---|---|---|
| PATENT NO. | : 7,842,325 B2 | Page 1 of 1 |
| APPLICATION NO. | : 10/499173 | |
| DATED | : November 30, 2010 | |
| INVENTOR(S) | : Warren Fitzsimons et al. | |

It is certified that error appears in the above-identified patent and that said Letters Patent is hereby corrected as shown below:

In Column 2, Page 1, Item 56, Line 38, under Other Publications, change "Fitzpatrick at al.," to --Fitzpatrick et al.--

In Column 1, Line 33, change "supplement" to --supplemented--

In Column 1, Line 34, change "isolate;" to --isolate,--

In Column 4, Line 17, change "skid" to --skim--

In Column 5, Line 32, change "flavour" to --flavours--

In Column 6, line 53, change "present" to --percent--

In Column 9, Line 21, change "off;" to --off,--

In Column 10, Line 29, change "~~170 rm." to --~170 rpm.--

In Column 11, Line 36 in Claim 3, line 2, after "the" delete "final".

Signed and Sealed this
First Day of November, 2011

David J. Kappos
*Director of the United States Patent and Trademark Office*